June 3, 1941.  D. I. BOHN  2,243,832
WELDING APPARATUS AND METHOD
Filed June 16, 1938
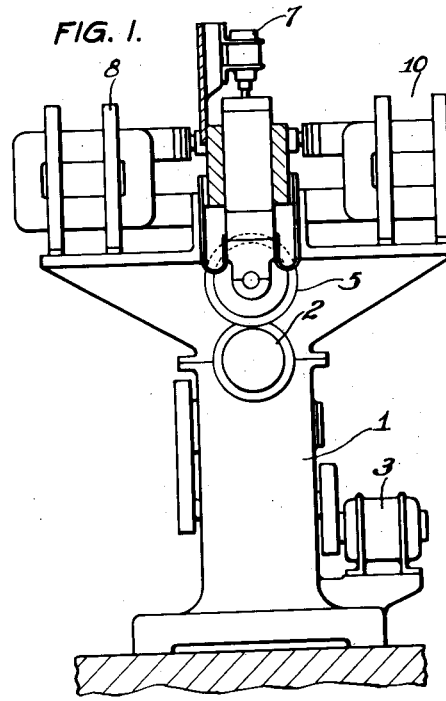
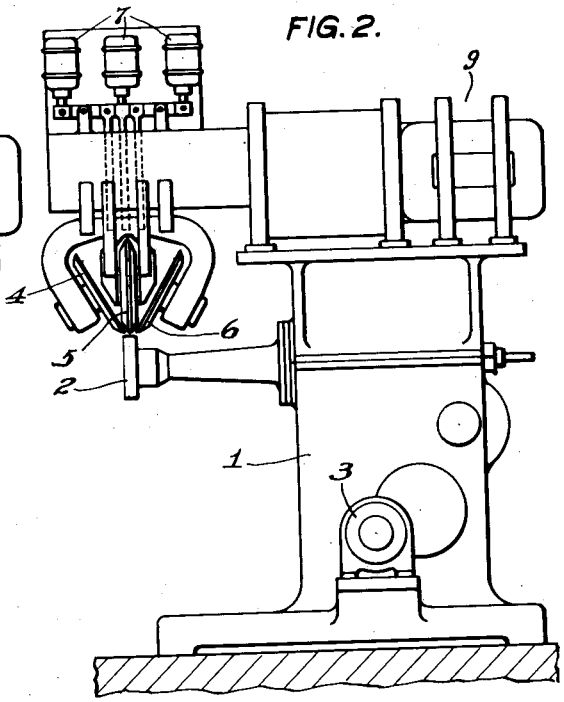
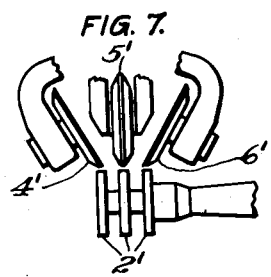
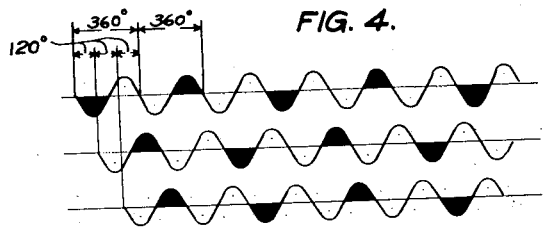
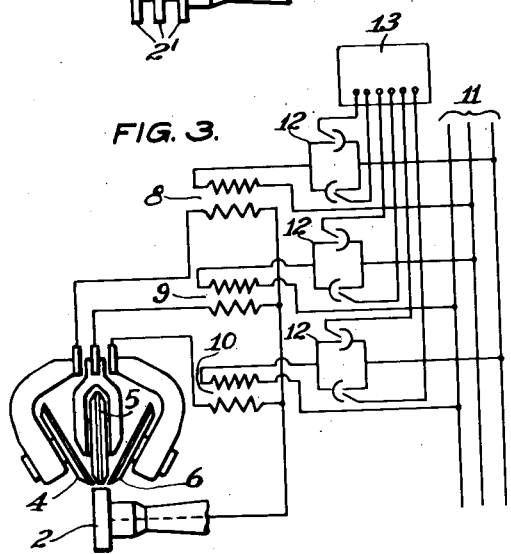
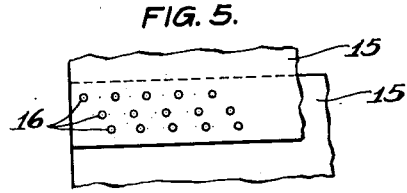
INVENTOR.
DONALD I. BOHN.
BY S. Ernest Low
ATTORNEY.

Patented June 3, 1941

2,243,832

UNITED STATES PATENT OFFICE 2,243,832

WELDING APPARATUS AND METHOD

Donald I. Bohn, Pittsburgh, Pa., assignor to Aluminum Company of America, Pittsburgh, Pa., a corporation of Pennsylvania Application June 16, 1938, Serial No. 214,030

11 Claims. (Cl. 219—4)

This invention relates to the welding of long lengths of thin gauge metal or metal foil, and particularly to the production of liquid- and gas-tight seams in such material.

It has been found practically impossible to produce a high strength continuous seam-weld, by any of the known processes, in metal of extremely thin gauge, which anneals at the welding temperature. Despite the highly accurate control equipment which has been developed for the operation of seam-welding mechanisms, when an attempt is made to utilize these machines in welding extremely thin gauge metal, the heat necessary to effect the weld seldom can be conducted away from the seam rapidly enough to prevent external melting of the material at intervals along the length of the seam. These difficulties heretofore have made it impossible to produce a practical welded structure in thin material of this character, which would be impervious to liquids or gases, and at the same time be of suitable strength.

Where the problem of joining edges of metal structures in a seam has not been concerned primarily with gas or liquid tightness, there has been present the problem of seam-joining thin gauge metal in a welded joint comparable in strength to the parent material. A continuous seam-weld, or a row of closely spaced spot-welds, has the effect of annealing heat-treated or cold-worked material in the seam, or of changing the metal structure in the weld of other material to a condition analogous to a cast structure, thus weakening the joint considerably below the strength of the parent material. It appears, therefore, that even though the heat of the weld or the spacing of the spots is proportioned so as to avoid external melting of the metal, there is still a difficulty in making a joint of high strength.

It is an object of the present invention to provide a liquid- and gas-impervious seam in thin gauge metal or metal foil, and particularly in thin gauges of aluminum or aluminum alloy. A further object is the provision of means whereby a continuous and gas-tight seam can be produced in such material by the utilization of a resistance welding process and its attendant economies, as contrasted with other methods of joining metal. A further object is the provision of means for the production of a unitary, gas-tight seam by a single, continuous operation capable of being performed at high speed and causing a minimum waste of material by reducing the amount of overlap required at the seam It is another object of this invention to provide a method of spacing and forming a multiple row of spot-welds, each spot and each row being so spaced as to obviate not only the external melting of the metal, but also the serious weakening of the joint, thereby forming a strong, relatively fluid-impervious seam.

Other objects are the efficient utilization of polyphase welding current in the welding operation whereby a balanced load may be put on a polyphase power supply, and the provision of means for effecting positive control of the current employed. Further objects will present themselves from the following description and the accompanying drawing, in which:

Fig. 1 represents a front elevation, partly in section, of a machine for effecting a seam of the type described;

Fig. 2 is a side elevation of the machine shown in Fig. 1;

Fig. 3 shows a simplified wiring diagram of the control mechanism;

Fig. 4 represents, schematically, the phase relationship of the current supplied to the welding electrodes to produce a given spot pattern;

Fig. 5 illustrates a spot pattern of the weld on a lap joint between two pieces of material being joined;

Fig. 6 shows an enlarged view, in section, through a spot-welded seam made according to one practice of the invention;

Fig. 7 illustrates a fragmentary view of a modified form of electrode arrangement.

The machine for effecting the welded joint according to my invention is shown in Figs. 1 and 2 of the drawing. The machine consists essentially of a base member or frame 1, upon which is mounted a disc electrode 2 adapted to be rotated by a suitable motor 3 through a suitable drive mechanism. Idle electrodes 4, 5, and 6 are mounted in suitable journals to permit their free rotation. The electrodes 4, 5, and 6 preferably are angularly mounted with their axes in the same vertical plane. Individual air cylinders 7 are connected to the supporting means for each of the electrodes 4, 5, and 6 in such manner that each electrode may be individually raised or lowered with respect to the driving electrode 2. The idle electrode 5 is bevelled on each side, as shown; idle electrodes 4 and 6 are each bevelled in one direction only, and are mounted in their supporting journals at an angle approximately corresponding to the angle of the bevel on each side of the electrode 5. By shaping and mounting the idle electrodes 4, 5, and 6, as shown, the work-contacting edges of the electrodes are brought relatively close together. The electrode 2 is of adequate width to span the work-contacting edges of the electrodes 4, 5, and 6.

Referring to Fig. 3, the electrodes 4, 5, and 6 are each connected to a secondary terminal of a separate welding transformer. In the form illustrated, the welding current is supplied through three single-phase transformers 8, 9, and 10 mounted on the aforementioned frame 1. It is apparent that one three-phase transformer may be used, with each of the electrodes 4, 5, and 6 connected respectively to a corresponding phase. A three-phase source of power is indicated by lines 11; and, in circuit with each primary of the transformer, suitable time control devices 12 are provided. The driving electrode 2 is connected in common with each secondary of the welding transformers 8, 9, and 10, thus forming the return for each of the three welding circuits.

The application of power to the welding electrodes may be controlled by a timer such as the electronic or ignitron-tube type shown diagrammatically in Fig. 3. The ignitron tubes 12 are energized from the time control 13 to produce the desired series of welding current impulses for each phase. The tubes are rendered conducting by the energization of their igniters, and send current through the primaries of the welding transformers 8, 9, and 10. A pair of ignitron tubes 12 are provided in parallel in the primary circuit for each phase. Each tube 12 will permit alternating current to pass in one direction only; and, when paired together in opposed relationship in the circuit, a pair of tubes 12 may be so energized and re-energized as to permit a predetermined number of cycles, or fractions of cycles, of alternating current to flow to each transformer for each weld. The secondary of each transformer includes the work circuit, as previously described.

In the preferred embodiment of my invention, the timing device 13, in combination with the ignitron tubes 12, is suitably adjusted to render one ignitron tube 12 conducting during each individual spot-weld, permitting one half-cycle of current to flow. By proper selection and adjustment of timer 13 in its control of the ignitron tubes 12, any desired pattern of sequential spot-welds may be obtained such as is illustrated in Figs. 4 and 5. For example, the darkened areas illustrated in Fig. 4 are representative of a predetermined adjustment of timer 13 to control the ignitron tubes 12 to give the definite spot pattern disclosed in Fig. 5.

In the operation of the apparatus, material to be welded, 15, is placed between the electrodes with the edges overlapping, as shown in Fig. 5. The air cylinders 7 are then actuated to bring the idle electrodes 4, 5, and 6 down upon the work and to apply pressure thereto. The welding circuit and electrode-driving motor are energized; and, as the material is fed along the seam at uniform speeds by rotation of the electrode 2, the spot-welds are effected by the sequential operation of the circuit previously described at the intervals illustrated in the darkened areas of the wave form in Fig. 4, producing a weld pattern along the overlapping edges of the material as shown in Fig. 5 at 16.

By arranging the electrodes in the manner shown, the rows of spots 16 may be closely spaced, permitting a joint of high mechanical strength to be formed with a minimum overlap of material. Because of the sequential application of power to the successive spots, the material being welded is not subjected to sufficient localized heating to burn through the material, as would be the case if only one row of spots were used with a relatively close spacing. The joint so formed is composed of areas of alternately strong parent metal and weakened weld metal; thus there is a resultant high efficiency joint with a minimum of low efficiency areas, which are ordinarily weakened by the structural change effected by the welding heat. The strength of a seam made in accordance with my invention very closely approximates the strength of the parent metal.

While the seams produced by the above-described methods are acceptable for most purposes, it is possible that they may prove incapable of retaining fluids under pressure in a particular structure in which they are utilized. I have found that, if the adjacent spaces of the overlapped material are covered with a slow-drying adhesive, lacquer, paint, or other sealing medium, prior to the welding operation, and the material is subjected to the welding operation prior to the drying of the substance used between the overlapping edges, an efficient, effective spot-weld can be made. Upon the subsequent drying of the interposed substance, a gas- and liquid-tight seam will be produced. It is apparent that some substances will be more effective than others for producing such seams, depending to a large extent upon the substance to be retained in the welded structure in which the seam is embodied. A section through a weld incorporating a suitable sealing or bonding material 14 is given as illustrative of a fluid-tight seam at Fig. 6.

Various phase relationships may be employed to give spot patterns varying from that described, and the spacing of the spots longitudinally of the seam may be varied with any fixed phase relationship by increasing or decreasing the speed of travel of the material through the electrodes. It is not essential that a polyphase power supply be employed to obtain the results and advantages of my invention. A single-phase current supply lends itself to the practice of this invention with only minor modifications in the electrical wiring set-up which will be apparent to those skilled in this art.

It is also possible, within the scope of my invention, to employ two or more lower driving electrodes in place of the single electrode shown at 2 in the preferred form of my invention. When two or more driving electrodes are employed, they serve to span the upper idle electrodes 4, 5, and 6 without departing materially from the results and advantages of my invention. Such an arrangement is disclosed in Fig. 7, wherein lower electrodes 2' are arranged in cooperative relationship with upper electrodes 4', 5', and 6'.

The above description of the preferred embodiment and practice of my invention is given for purposes of illustration, and the invention should be limited only by the scope of the claims appended hereto.

I claim:

1. In an apparatus for welding lap seams in a predetermined pattern of spots, the combination comprising a plurality of electrodes mounted in juxtaposition and connected respectively to different terminals of a supply of electrical current, an independently mounted electrode against which the work is pressed, said last-mentioned electrode commonly connecting to return terminals of said current supply, and means for independently passing electrical energy through each of said juxtapositioned electrodes in selected fractions of cycles of alternation of welding current at predetermined intervals.

2. In an apparatus for welding lap seams, the combination comprising three independent electrodes adapted to be rotated by contact with the work and angularly mounted in juxtaposition to engage the work at closely spaced points, said electrodes being connected respectively to different phases of a three-phase supply of electrical current, an independently mounted rotating electrode against which the work is pressed and adapted to advance the work, said rotating electrode commonly connecting to said phases of current supply and spanning the points of contact of said rotary electrodes, and means for independently passing electrical energy through each of said juxtapositioned electrodes in selected half cycles of alternation of welding current at predetermined intervals.

3. In an apparatus for welding lap seams, the combination comprising three idle electrodes independently mounted in juxtaposition and adapted to be driven by the advancing work, each of said electrodes being independently connected to one phase terminal of a three-phase transformer, a driving electrode adapted to advance the work and connecting to each return phase terminal of the transformer to complete three welding circuits common to said driving electrode, and means for timing the application of current to the transformer whereby spot-welds are made in a predetermined pattern as the work is advanced between the electrodes.

4. In an apparatus for welding lap seams, elements including a plurality of independently mounted rotary electrodes having their axes of rotation in substantially the same plane and having their peripheries in juxtaposition at the work piece, said electrodes being connected respectively to different phases of a polyphase current supply, an independently mounted rotating electrode against which the work is pressed and adapted to advance the work, said rotating electrode commonly connecting to said phases of current supply, and means for controlling the time sequence of the application of welding current to said electrodes, said above-mentioned elements and means in combination whereby a seam-weld may be effected in a predetermined pattern of a plurality of rows of spot-welds.

5. In an apparatus for welding lap seams, the combination comprising three rotary electrodes angularly mounted with their peripheries in juxtaposition at the points of contact with the work piece, two of said electrodes with contact surfaces bevelled at angles substantially equal to the angles each make with the work piece, the central and third of said electrodes with a contact surface double bevelled at substantially the angles made by the other two electrodes with said central electrode, said electrodes being independently mounted and connected to a three-phase supply of electrical current, and an independently mounted rotating electrode adapted to advance the work and commonly connecting to said phases of current supply to complete three separate welding circuits.

6. In an apparatus for welding lap seams, the combination comprising a plurality of independently mounted rotary electrodes connected respectively to different phases of a polyphase supply of electrical current, said electrodes having their peripheries in juxtaposition at the work, an opposite cooperating plurality of rotating electrodes against which the work is pressed, said last-mentioned electrodes mutually connecting to each of said phases of current supply, and means for passing electrical energy in selected half cycles of alternation of welding current through each of said rotary electrodes at predetermined intervals.

7. In a method of making a multiple spot, lap-welded joint in thin gauge metal, the steps comprising coating the weld surfaces of the metal with a slow-drying adhesive, effecting a predetermined, selected pattern of spot-welds before said adhesive sets, said spots being disposed in parallel rows with the spots in adjacent rows disposed in staggered relationship, controlling the intensity of electrical current input to each weld, whereby the characteristics of the metal incorporated in each weld is confined to that area immediately adjacent each weld and otherwise providing areas of metal between the spots rendered fluid impervious by the adhesive and unaffected by welding heat.

8. In a method of making a multiple spot, lap-welded joint in thin gauge metal, the steps comprising coating the weld surfaces of the metal with a slow-drying adhesive, continuously and substantially simultaneously effecting a predetermined, selected multiple row of spot-welds before said adhesive sets, said spots being disposed in parallel rows with the spots in adjacent rows disposed in staggered relationship, controlling the intensity of electrical current input to each weld, whereby the characteristics of the metal incorporated in each weld is confined to that area immediately adjacent each weld and otherwise providing areas of metal between the spots rendered fluid impervious by the adhesive and unaffected by welding heat.

9. The method of welding lap seams in thin gauge metals, which comprises coating the weld surfaces of the metal with a slow-drying adhesive, welding said metals before the slow-drying adhesive sets in a plurality of closely spaced rows of spot-welds, and spacing the spots in adjacent rows in staggered relationship to provide areas unaffected by welding heat, whereby a fluid-impervious seam is produced.

10. In a method of making a multiple spot, lap-welded joint in thin gauge metal, the steps comprising coating the weld surfaces of the metal with a slow-drying adhesive, continuously effecting spot-welds through said overlapped metal and adhesive before the adhesive sets, spacing the spots in adjacent rows in close, staggered relationship to provide areas rendered fluid impervious by the adhesive and unaffected by the welding heat, and impressing an alternating electrical current input at each spot, the duration of current input being controlled in terms of selected half cycles of alternation.

11. In an apparatus of the character described a plurality of electrodes in juxtaposition connected respectively to terminals of an electric current supply, an electrode opposed to said first mentioned electrodes connected to opposed terminals of said current supply, and means for passing electric current through each of said juxtaposed electrodes in fractions of cycles of welding current at spaced intervals.

DONALD I. BOHN.